(12) United States Patent
Ueno (10) Patent No.: US 7,400,060 B2
(45) Date of Patent: Jul. 15, 2008

(54) POWER SUPPLY SYSTEM FOR A VEHICLE

(75) Inventor: Yukiyasu Ueno, Nishio (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 11/135,401

(22) Filed: May 24, 2005

(65) Prior Publication Data

US 2005/0264268 A1   Dec. 1, 2005

(30) Foreign Application Priority Data

May 25, 2004   (JP)   ............... 2004-154730

(51) Int. Cl.
- B60L 1/00   (2006.01)
- B60L 3/00   (2006.01)
- H02G 3/00   (2006.01)

(52) U.S. Cl. .................................... 307/10.1
(58) Field of Classification Search ............... 307/10.1; 323/234; 320/104
See application file for complete search history.

(56) References Cited

U.S. PATENT DOCUMENTS

| | | | | |
|---|---|---|---|---|
| 5,089,768 A | * | 2/1992 | Sato | ........................... 323/318 |
| 5,995,891 A | | 11/1999 | Mayumi et al. | ............... 701/45 |
| 6,580,180 B2 | * | 6/2003 | Tamai et al. | ............... 307/10.1 |
| 7,078,829 B2 | * | 7/2006 | Hunninghaus et al. | ..... 307/10.6 |

FOREIGN PATENT DOCUMENTS

| JP | A-8-310337 | 11/1996 |
|---|---|---|
| JP | A-10-129402 | 5/1998 |

* cited by examiner

Primary Examiner—Stephen W Jackson
Assistant Examiner—Carlos Amaya
(74) Attorney, Agent, or Firm—Posz Law Group, PLC (57) ABSTRACT

In a power supply system for a passive safety device, a step-up circuit steps up an input voltage based on a supply voltage from a battery to obtain a predetermined output voltage. An input voltage detecting circuit detects the input voltage. An output voltage changing circuit changes the output voltage based on a detection signal from the input voltage detecting circuit. Thus, the control load on the step-up circuit is reduced and increase in the size and rating of the step-up circuit is suppressed.

15 Claims, 6 Drawing Sheets

POWER SUPPLY SYSTEM FOR A VEHICLE

CROSS REFERENCE TO RELATED APPLICATION

This application is based on and incorporates herein by reference Japanese Patent Application No. 2004-154730 filed on May 25, 2004.

FIELD OF THE INVENTION

The present invention relates to a power supply system for a vehicle having a vehicle device such as a passive safety device.

BACKGROUND OF THE INVENTION

Figure 7:
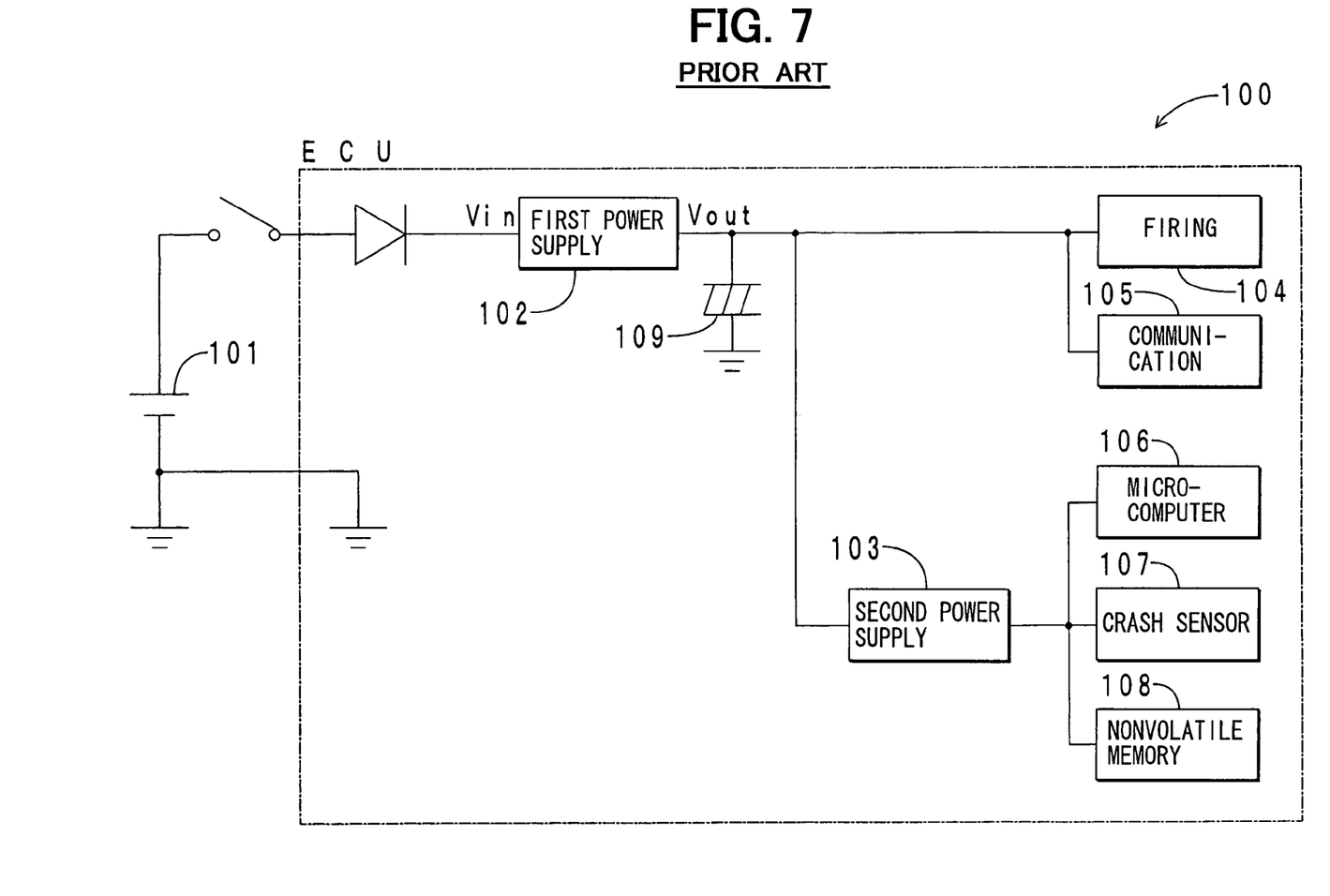
FIG. 7 is a block diagram of a conventional power supply system.

A conventional power supply system 100 for a vehicle (for instance, JP 10-129402 A2 and JP 08-310337 A2), as illustrated in FIG. 7, comprises a battery 101, a first power supply circuit 102, a second power supply circuit 103, a firing circuit 104, a satellite sensor communication circuit 105, a microcomputer 106, a crash sensor 107, a nonvolatile memory 108 and a backup capacitor 109.

The first power supply circuit 102 steps up or boosts an input voltage vin based on the supply voltage of the battery 101 to provide a predetermined high output voltage Vout (24V). The output voltage Vout is supplied to the firing circuit 104, satellite sensor communication circuit 105 and second power supply circuit 103. The backup capacitor 109 is charged with the output voltage Vout. The second power supply circuit 103 steps down the output voltage Vout to provide a predetermined low output voltage (5V). The input voltage at which the second power supply circuit 103 can stably operate as a 5V regulator is 5.5V. The output voltage of the second power supply circuit 103 is used as power supply voltage for the microcomputer 106, crash sensor 107 and nonvolatile memory 108.

Recently, the power supply system 100 is provided with occupant protecting functions against rear seat side impact and roll over as well as against front impact and front seat side impact. For this reason, the numbers of installed satellite sensors and airbags tend to increase. The processing speed of the microcomputer 106 is increased. For high performance of the power supply system 100, more than one microcomputer 106 may be installed. In this instance, the current consumption in ECUs (Electronic Control Units) is increased. This will result in the increased size and rating of the first power supply circuit 102.

The load on the first power supply circuit 102, that is, the voltage step-up control load is increased with increase in the difference between the input voltage Vin and the output voltage Vout. That is, the lower the supply voltage from the battery 101 is, the higher the voltage step-up control load is. To stably ensure the desired output voltage Vout according to the magnitude of the difference between the input voltage Vin and the output voltage Vout, the size and rating of the first power supply circuit 102 must be increased.

Figure 8:
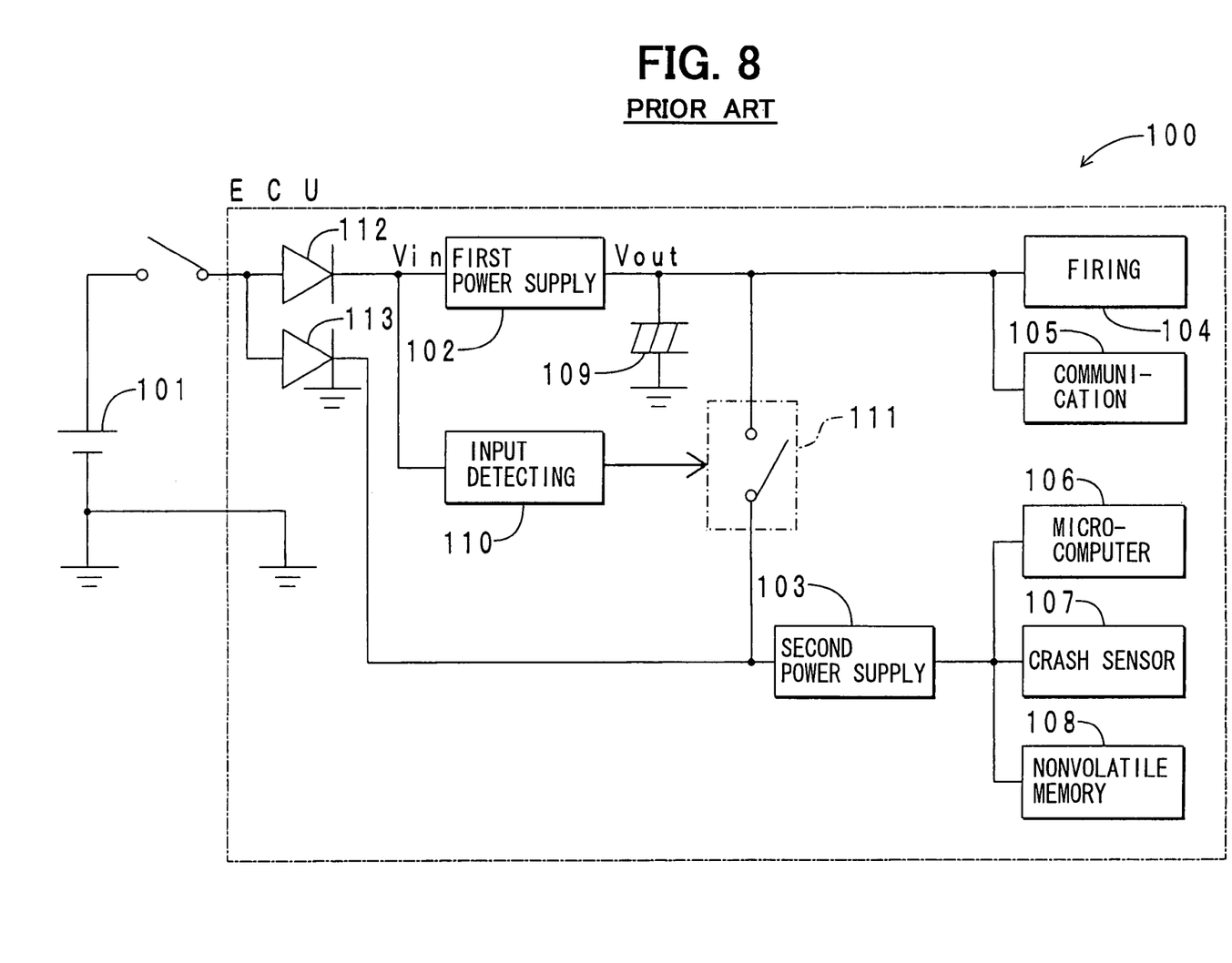
FIG. 8 is a block diagram of another conventional power supply system.

In consideration of the foregoing, another passive safety device is proposed in, for instance JP 09-290704A2 (U.S. Pat. No. 5,995,891), to reduce the current born by the first power supply circuit 102. This device is shown in FIG. 8.

This power supply system 100 is different from that shown in FIG. 7 in that an input voltage detecting circuit 110, a switching element 111 and reverse current blocking diodes 112, 113 are additionally installed. In the input voltage detecting circuit 110, the input voltage Vin is compared with a predetermined threshold value (5.5V). When the input voltage Vin is 5.5V or higher, the switching element 111 is opened (turned off) by a signal from the input voltage detecting circuit 110. For this reason, the first power supply circuit 102 and the second power supply circuit 103 are disconnected from each other. When the input voltage Vin is lower than 5.5V, the switching element 111 is closed by the signal from the input voltage detecting circuit 110. For this reason, the first power supply circuit 102 and the second power supply circuit 103 are connected to each other.

In this power supply system 100, the current for the downstream side of the second power supply circuit 103 need not be ensured at the first power supply circuit 102 when the input voltage Vin is 5.5V or higher. It need not be ensured when the supply voltage from the battery 101 is 6.5V or higher with the voltage drop (1V) at a reverse current blocking diode 112 taken into account. For this reason, the voltage step-up control load on the first power supply circuit 102 can be reduced. Therefore, increase in the size and rating of the first power supply circuit 102 can be suppressed.

However, when the supply voltage from the battery 101 is lower than 6.5V, it is difficult to ensure the operation of the second power supply circuit 103. It is assumed here that the second power supply circuit 103 is operated with the supply voltage from the battery 101 being up to 6V. As described above, the input voltage at which the second power supply circuit 103 can stably operate as a 5V regulator is 5.5V For this reason, in the power supply system 100, the second power supply circuit 103 cannot be operated, when the supply voltage from the battery 101 is within the range between 6V (inclusive) and 6.5V (exclusive) with voltage drop (1V) at the reverse current blocking diode 113.

SUMMARY OF THE INVENTION

The present invention therefore has an object to provide a power supply system for a vehicle having a vehicle device such as a passive safety device, wherein a vehicle device function is not impaired even at lower battery voltages, control load on a step-up circuit is reduced and increase in size and rating of the step-up circuit can be reduced.

According to a power supply system for a vehicle, a step-up circuit steps up an input voltage based on a supply voltage from a battery to obtain a predetermined output voltage. An input voltage detecting circuit detects the input voltage. An output voltage changing circuit changes the output voltage based on a detection signal from the input voltage detecting circuit. Thus, the control load on the step-up circuit is reduced, and increase in the size and rating of the step-up circuit is suppressed.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
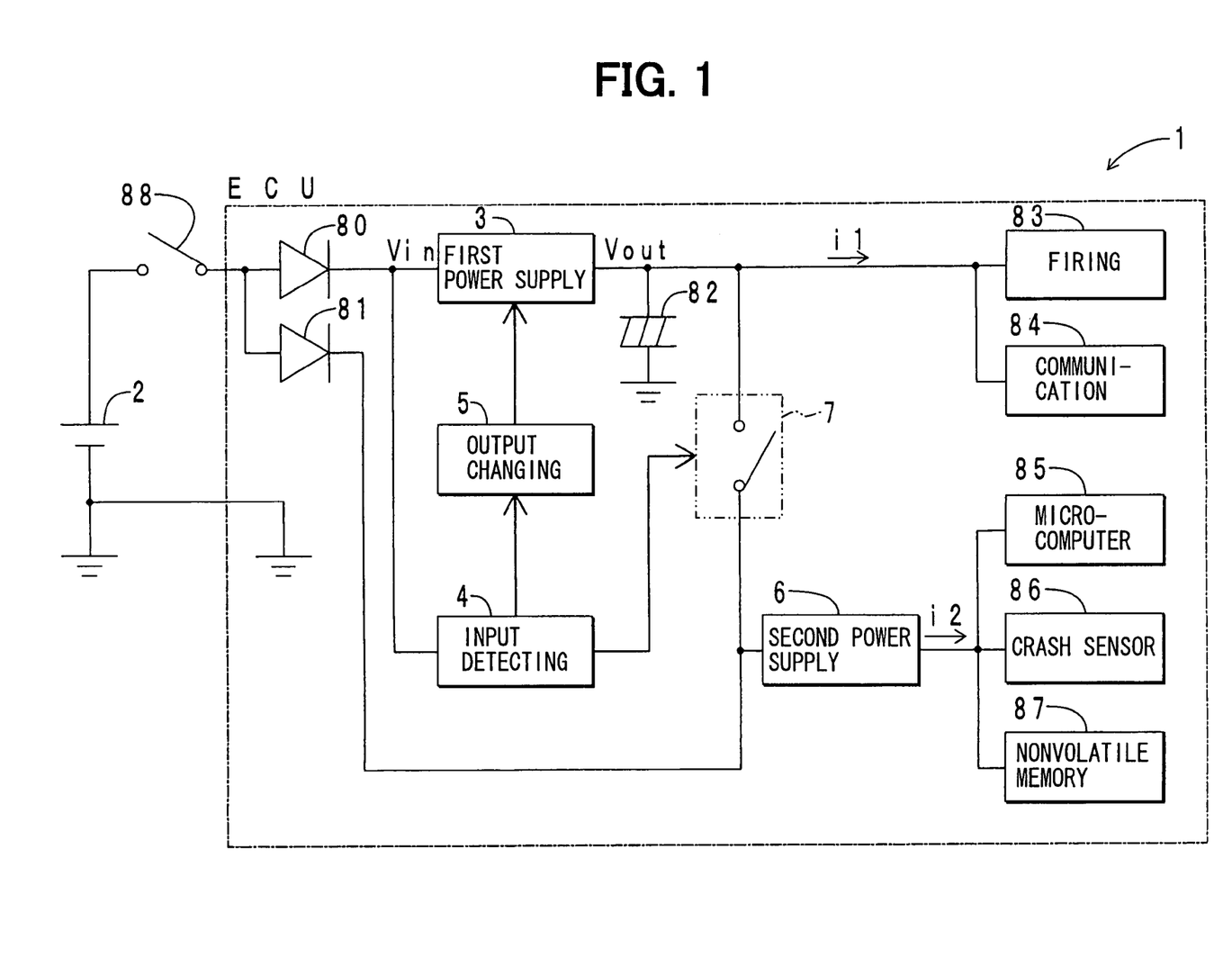
FIG. 1 is a block diagram of a power supply system for a vehicle according to a first embodiment of the present invention.

Referring first to FIG. 1, a power supply system 1 is applied to a passive safety device of a vehicle. It comprises a battery 2, a first power supply circuit 3, an input voltage detecting circuit 4, an output voltage changing circuit 5, a second power supply circuit 6, a switching element 7, reverse current blocking diodes 80 and 81, a backup capacitor 82, a firing circuit 83, a satellite sensor communication circuit 84, a microcomputer 85, a crash sensor 86, a nonvolatile memory 87 and an ignition switch 88. Of these elements, the first power supply circuit 3 is a step-up or booster circuit. The second power supply circuit 6 is a step-down circuit. The firing circuit 83 is one of actuators in the vehicle and the crash sensor 86 may be any type which responds to decelerations of the vehicle.

The battery 2 is mounted in the engine compartment (not shown) of the vehicle. The battery 2 is multipoint-connected on the high potential side with the reverse current blocking diodes 80 and 81 through the ignition switch 88. The reverse current blocking diodes 80 and 81 prevent a current from flowing from its cathode side to its anode side. The first power supply circuit 3 steps up and controls the input voltage Vin (cathode-side voltage of the reverse current blocking diode 80) to a predetermined high output voltage Vout. The input voltage detecting circuit 4 monitors the input voltage Vin. In addition, the input voltage detecting circuit 4 compares the input voltage Vin with a first threshold value Vth1. It produces the result of comparison as a detection signal to the output voltage changing circuit 5. The output voltage changing circuit 5 changes the voltage level of the output voltage Vout of the first power supply circuit 3 based on the detection signal from the input voltage detecting circuit 4.

The first power supply circuit 3 is multipoint-connected on the output side with the backup capacitor 82, firing circuit 83, satellite sensor communication circuit 84 and switching element 7. The backup capacitor 82 is used as an alternative power supply, for example, when the power supply from the battery 2 is interrupted. In the firing circuit 83, a squib (not shown) is disposed for actuating an inflator for an airbag (not shown). The satellite sensor communication circuit 84 is fed with crash signals from a satellite sensor (not shown) disposed at, for example, the front end of the vehicle, B-pillar, or the like. The switching element 7 is fed with a detection signal from the input voltage detecting circuit 4. That is, the switching element 7 is driven to open (turn off) and close (turn on) by the detection signal.

The switching element 7 is connected on the output side with the second power supply circuit 6. The second power supply circuit 6 is also connected on the input side with the battery 2 through the reverse current blocking diode 81 and the ignition switch 88. The second power supply circuit 6 outputs a constant voltage of 5V The input voltage (the input-side voltage of the second power supply circuit 6) at which the second power supply circuit 6 can stably operate as a 5V regulator is 5.5V.

The second power supply circuit 6 is multipoint-connected on the output side with the microcomputer 85, crash sensor 86 and nonvolatile memory 87. The microcomputer 85 carries out crash determination based on crash signals from the satellite sensor and the crash sensor 86. The nonvolatile memory 87 stores the results of the ECU's self-diagnoses and the like.

A crash signal from the satellite sensor is inputted to the microcomputer 85 through the satellite sensor communication circuit 84. The microcomputer 85 is also fed with a crash signal from the crash sensor 86. A crash threshold value is stored in the ROM (not shown) of the microcomputer 85. The microcomputer 85 carries out crash determination by comparing the moving average value of the sectional integration values of the inputted crash signals with the stored crash threshold value. When the result of determination indicates "collision," the firing circuit 83 is energized to activate the squib. As a result, the inflator (not shown) is actuated, and the airbag is inflated in the vehicle compartment.

Figure 2:
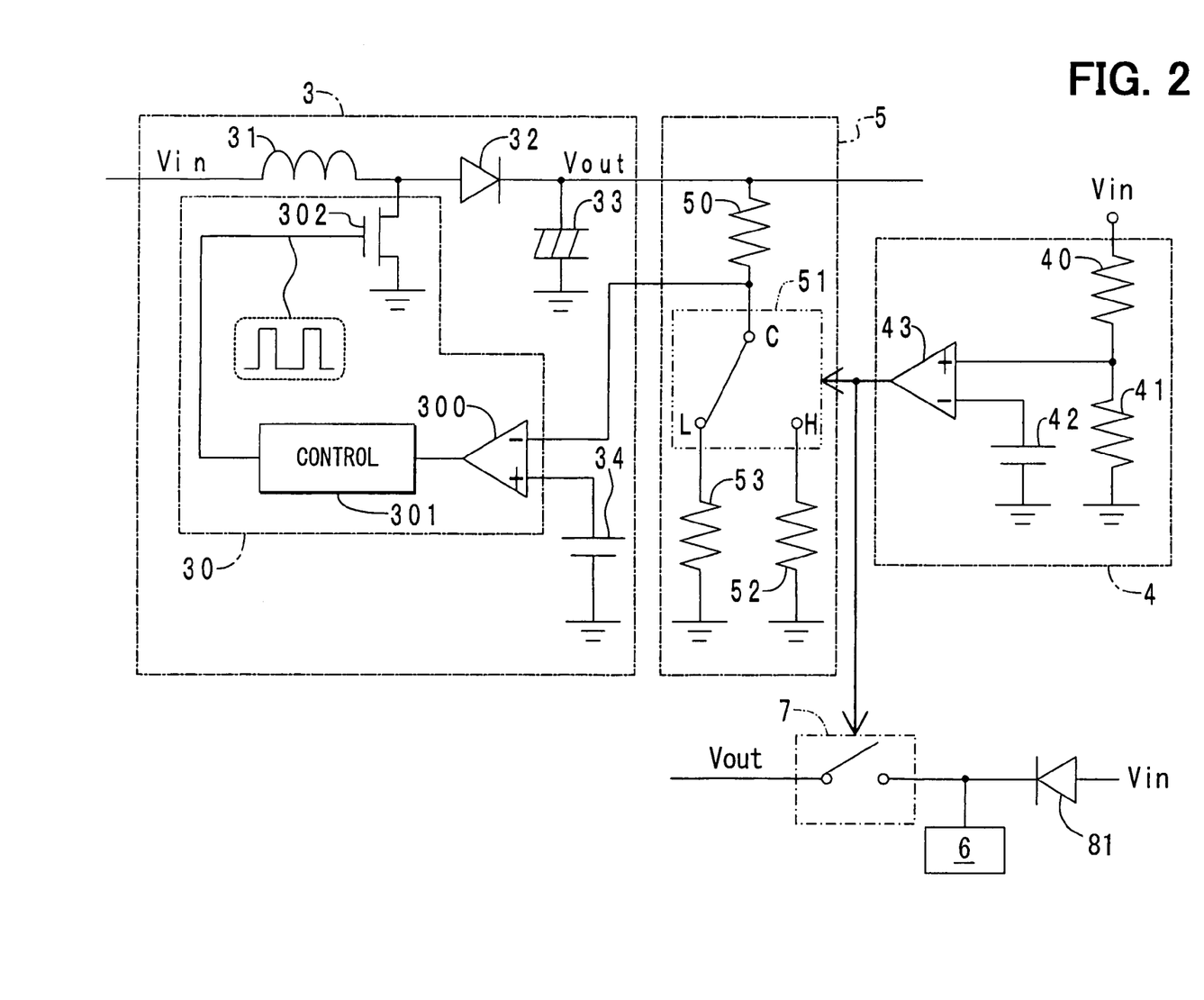
FIG. 2 is a partial circuit diagram of the power supply system in the first embodiment.

As illustrated in FIG. 2, the input voltage detecting circuit 4 comprises resistors 40, 41, a reference voltage source 42 and a comparator 43. The resistor 40 and the resistor 41 are connected in series with each other. The positive terminal of the comparator 43 is connected to the intermediate point between the resistor 40 and the resistor 41. The negative terminal of the comparator 43 is connected to the reference voltage source 42.

The output voltage changing circuit 5 comprises resistors 50, 52, 53 and a selector switch 51. The resistor 50 connects the output side of the first power supply circuit 3 and the common terminal C of the selector switch 51. The H-contact of the selector switch 51 is connected with the resistor 52. The L-contact of the selector switch 51 is connected with the resistor 53. The selector switch 51 is fed with a high level signal and a low level signal from the comparator 43. As a result of switching of the selector switch 51, the resistor 50 and the resistor 52 or the resistor 50 and the resistor 53 are connected with each other. That is, the output voltage Vout is resistance-divided by the resistor 50 and the resistor 52, or by the resistor 50 and the resistor 53. The voltage division ratio of the resistors 50 and 52 is different from the voltage division ratio of the resistors 50 and 53.

The first power supply circuit 3 comprises a feedback circuit 30, a coil 31, a diode 32, a capacitor 33, and a reference voltage source 34. The feedback circuit 30 comprises a comparator 300, a control circuit 301 and a transistor 302. The transistor 302 is for switching the output voltage. The first power supply circuit 3 is a known chopper-type step-up circuit. The negative terminal of the comparator 300 is connected to the intermediate point between the resistor 50 and the selector switch 51. The positive terminal of the comparator 300 is connected to the reference voltage source 34. The control circuit 301 is fed with a high level signal and a low level signal from the comparator 300. The control circuit 301 controls the switching of the transistor 302.

Figure 3:
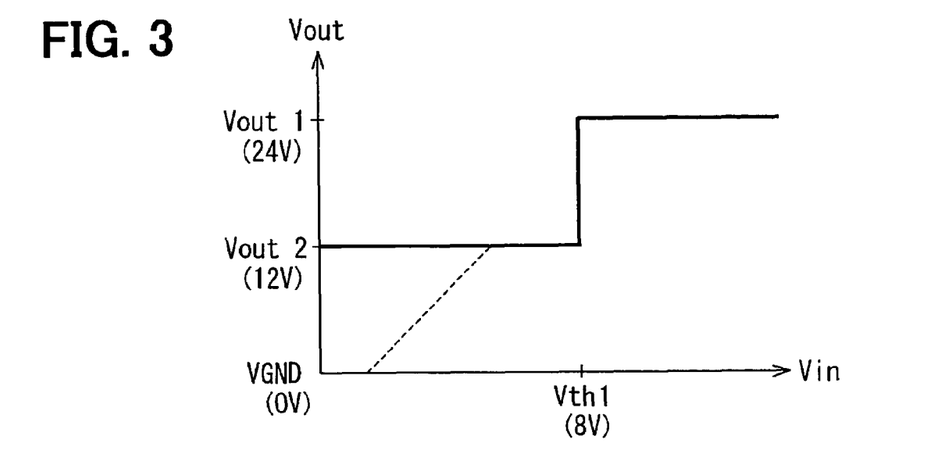
FIG. 3 is a graph of an output voltage change data for the power supply system in the first embodiment.

As shown in FIG. 3 illustrating an output voltage change characteristic for the passive safety device, when the input voltage Vin is equal to or higher than a first threshold value Vth1 (8V), the output voltage Vout is regulated to a first output voltage Vout1 (24V). When the input voltage Vin is lower than the first threshold value Vth1, the output voltage Vout is regulated to a second output voltage Vout2 (12V). Thus, the output voltage Vout is changed stepwise in two stages with the first threshold value Vth1. In FIG. 3, the solid line indicates a target voltage. Actual output voltage however varies as indicated by the dotted line, for example. This dotted line indicates an output voltage drop phenomenon caused by the following conditions: the input voltage Vin excessively lowers, and a control current required to step up the voltage through the first power supply circuit 3 cannot be sufficiently passed.

As described with reference to FIG. 2, the input voltage Vin is divided by the resistors 40 and 41. The divided voltage value from the input voltage Vin is inputted to the comparator 43 through its positive terminal. The voltage of the reference voltage source 42 is set to a voltage division value obtained by dividing the first threshold value Vth1 at the voltage division ratio of the resistors 40 and 41. The voltage division value is inputted to the comparator 43 through its negative terminal. Thus, the comparator 43 compares the input voltage Vin with the first threshold value Vth1 through the comparison of the divided voltage value from the input voltage Vin with the voltage division value from the first threshold value Vth1. When Vin≧Vth1, the comparator 43 outputs a high level signal. When Vin<Vth1, the comparator 43 outputs a low level signal.

When the comparator 43 outputs the high level signal, electrical connection is established between the common terminal C and the H-contact of the selector switch 51. For this reason, the resistor 50 and the resistor 52 are connected in series with each other. Therefore, the output voltage Vout is divided by the resistors 50 and 52. The divided voltage value from the output voltage Vout is inputted to the comparator 300 in the first power supply circuit 3 through its negative terminal.

When the comparator 43 outputs the low level signal, electrical connection is established between the common terminal C and the L-contact of the selector switch 51. For this reason, the resistor 50 and the resistor 53 are connected in series with each other. Therefore, the output voltage Vout is divided by the resistors 50 and 53. The divided voltage value from the output voltage Vout is inputted to the comparator 300 in the first power supply circuit 3 through its negative terminal.

The signals of the comparator 43 are also inputted to the switching element 7. When the comparator 43 outputs the high level signal, the switching element 7 is opened. For this reason, the output side of the first power supply circuit 3 and the input side of the second power supply circuit 6 are disconnected from each other. When the comparator 43 outputs the low level signal, the switching element 7 is closed. For this reason, the output side of the first power supply circuit 3 and the input side of the second power supply circuit 6 are connected to each other.

The comparator 300 is fed through its positive. terminal with the predetermined reference voltage from the reference voltage source 34. The comparator 300 compares the divided voltage value from the output voltage Vout, inputted through its negative terminal, with the reference voltage, inputted through its positive terminal. When the result of comparison produces that the divided voltage value<the reference voltage, the comparator 300 outputs the high level signal. This means that the output voltage Vout has not reached the target voltage.

When the comparator 43 outputs the high level signal, the target voltage corresponds to the first output voltage Vth1. When the comparator 43 outputs the low level signal, the target voltage corresponds to the second output voltage Vth2.

The high level signal from the comparator 300 is inputted to the control circuit 301. On receipt of the high level signal, the control circuit 301 generates a periodic pulse-shaped rectangular signal. The control circuit 301 transmits an on/off command signal based on the rectangular signal to the transistor 302.

When the result of comparison at the comparator 300 produces that the divided voltage value≧the reference voltage, the comparator 300 outputs a low level signal. This means that the output voltage Vout has reached the target voltage. The low level signal from the comparator 300 is inputted to the control circuit 301. On receipt of the low level signal, the control circuit 301 stops generating the rectangular signal. Therefore, the transistor 302 is held turned off.

As described above, when the input voltage Vin is equal to or higher than the first threshold value Vth1, the output voltage Vout is regulated to the first output voltage Vout1 by the feedback of the output voltage Vout1. Further, the switching element 7 is opened. For this reason, electrical connection between the first power supply circuit 3 and the second power supply circuit 6 is interrupted. Therefore, the first power supply circuit 3 only has to bear the current i1 of the firing circuit 83 and the satellite sensor communication circuit 84. The current i2 of the second power supply circuit 6 is supplied from the battery 2 to the second power supply circuit 6 through the reverse current blocking diode 81.

When the input voltage Vin is lower than the first threshold value Vth1, the output voltage Vout is regulated to the second output voltage Vout2 by the feedback of the output voltage Vout2. Further, the switching element 7 is closed. For this reason, connection is ensured between the first power supply circuit 3 and the second power supply circuit 6. Therefore, the first power supply circuit 3 bears the currents i1 and i2.

With the power supply system 1, the output voltage Vout can be changed according to the voltage level of the input voltage Vin. More specifically, when the input voltage Vin is equal to or higher than the first threshold value Vth1, the output voltage Vout is regulated to the first output voltage Vout1. When the input voltage Vin is lower than the first threshold value Vth1, the output voltage Vout is regulated to the second output voltage Vout2. That is, when the input voltage Vin is high, the output voltage Vout also becomes high. When the input voltage Vin is low, the output voltage Vout also becomes low. For this reason, the difference between the input voltage Vin and the output voltage Vout is reduced. Therefore, the voltage step-up control load to be borne by the first power supply circuit 3 can be reduced. In addition, increase in the size and rating of the first power supply circuit 3 can be suppressed.

The input voltage detecting circuit 4 of the power supply system 1 in this embodiment compares the input voltage Vin with the first threshold value Vth1 through the comparison of the divided voltage value from the input voltage Vin with the voltage division value from the first threshold value Vth1. For this reason, the setting of the first threshold value Vth1 can be varied also by the adjustment of the divided voltage value. This leads to the enhanced degree of freedom in setting.

In the power supply system 1, the first power supply circuit 3 and the second power supply circuit 6 are connected or disconnected with reference to the first threshold value Vth1. More specifically, when the input voltage Vin is equal to or higher than the first threshold value Vth1 (8V), the switching element 7 is opened. Namely, the switching element 7 is opened when the supply voltage of the battery 2 is 9V or higher with the voltage drop (1V) at the reverse current blocking diode 80 taken into account. As a result, the first power supply circuit 3 and the second power supply circuit 6 are disconnected from each other.

For this reason, when the supply voltage of the battery 2 is 9V or higher, the first power supply circuit 3 need not bear the current i2 of the second power supply circuit 6. Therefore, the voltage step-up control load to be borne by the first power supply circuit 3 can be reduced. Further, increase in the size and rating of the first power supply circuit 3 can be suppressed.

When the input voltage Vin is lower than the first threshold value Vth1, the switching element 7 is closed. Namely, the switching element 7 is closed when the supply voltage of the battery 2 is lower than 9V with the voltage drop at the reverse current blocking diode 80 taken into account. As a result, the first power supply circuit 3 and the second power supply circuit 6 are connected with each other.

For this reason, when the supply voltage of the battery 2 is lower than 9V, the first power supply circuit 3 must bear both currents: the current i1 of the firing circuit 83 and the satellite sensor communication circuit 84 and the current i2 of the second power supply circuit 6. However, when the supply voltage of the battery 2 is lower than 9V, the output voltage Vout is regulated to the lower voltage, or the second output voltage Vout2 (12V). For this reason, the voltage step-up control load on the first power supply circuit 3 can be reduced more than in cases where the output voltage Vout is held at the constant value, or the first output voltage Vout1 (24V). In addition, increase in the size and rating of the first power supply circuit 3 can be suppressed.

When the power supply from the battery 2 is interrupted due to collision, the input voltage Vin becomes lower than Vth1. For this reason, the switching element 7 is closed, and the first power supply circuit 3 and the second power supply circuit 6 are connected with each other. Therefore, power supply voltage can be supplied from the backup capacitor 82 to the second power supply circuit 6.

When the supply voltage from the battery 2 excessively lowers, this battery anomaly can be detected by the input voltage detecting circuit 4 through the voltage level of the input voltage Vin. For this reason, for example, the battery warning light or the SRS warning light in a meter cluster (not shown) can be turned on by a signal from the input voltage detecting circuit 4.

The power supply system 1 is provided with the feedback circuit 30. For this reason, the output voltage Vout can be easily caused to reach the target voltage (first output voltage Vout1 or second output voltage Vout2).

The output voltage changing circuit 5 changes the resistor connection, that is, the voltage division ratio based on the detection signal from the input voltage detecting circuit 4. More specifically, when the high level signal is outputted from the comparator 43, the resistor 50 and the resistor 52 are connected with each other through the selector switch 51. When the low level signal is outputted from the comparator 43, the resistor 50 and the resistor 53 are connected with each other through the selector switch 51. For this reason, the output voltage Vout can be regulated by the feedback control without changing the reference voltage of the reference voltage source 34.

The first threshold value Vth1 (8V) is set to the value lower than the voltage at which an engine can be started. For this reason, the output voltage Vout of the first power supply circuit 3 is regulated to the first output voltage Vout1 (24V) during running. Therefore, electric charges sufficient to implement the following are stored in the backup capacitor 82: the power supply system 1 is backed up for a predetermined time even when the power supply from the battery 2 is interrupted due to collision that occurs during running.

The supply voltage from the battery 2 can be lowered due to, for example, a trouble in the vehicle power generation system even though the vehicle is running. Meanwhile, there is a demand to keep the power supply system 1 operating as long as an engine control ECU (not shown) can be operated with the supply voltage from the battery 2.

With respect to this, the power supply system 1 brings the following advantage: even when the input voltage Vin drops below the first threshold value Vth1 (8V), the output voltage Vout can be held at the second output voltage Vout2 (12V). Namely, the output voltage Vout can be held at the second output voltage Vout2 even when the supply voltage from the battery 2 drops below 9V Therefore, the second power supply circuit 6 and thus the power supply system 1 can be operated.

Even when the input voltage Vin drops below the first threshold value Vth1, the backup capacitor 82 can be charged by the output voltage Vout. For this reason, the second power supply circuit 6 can be operated by the electric charge stored in the backup capacitor 82.

<Second Embodiment>

In this embodiment, the output voltage Vout is changed in three stages and the reference voltage rather than the voltage division ratio is changed in the feedback control.

Figure 4:
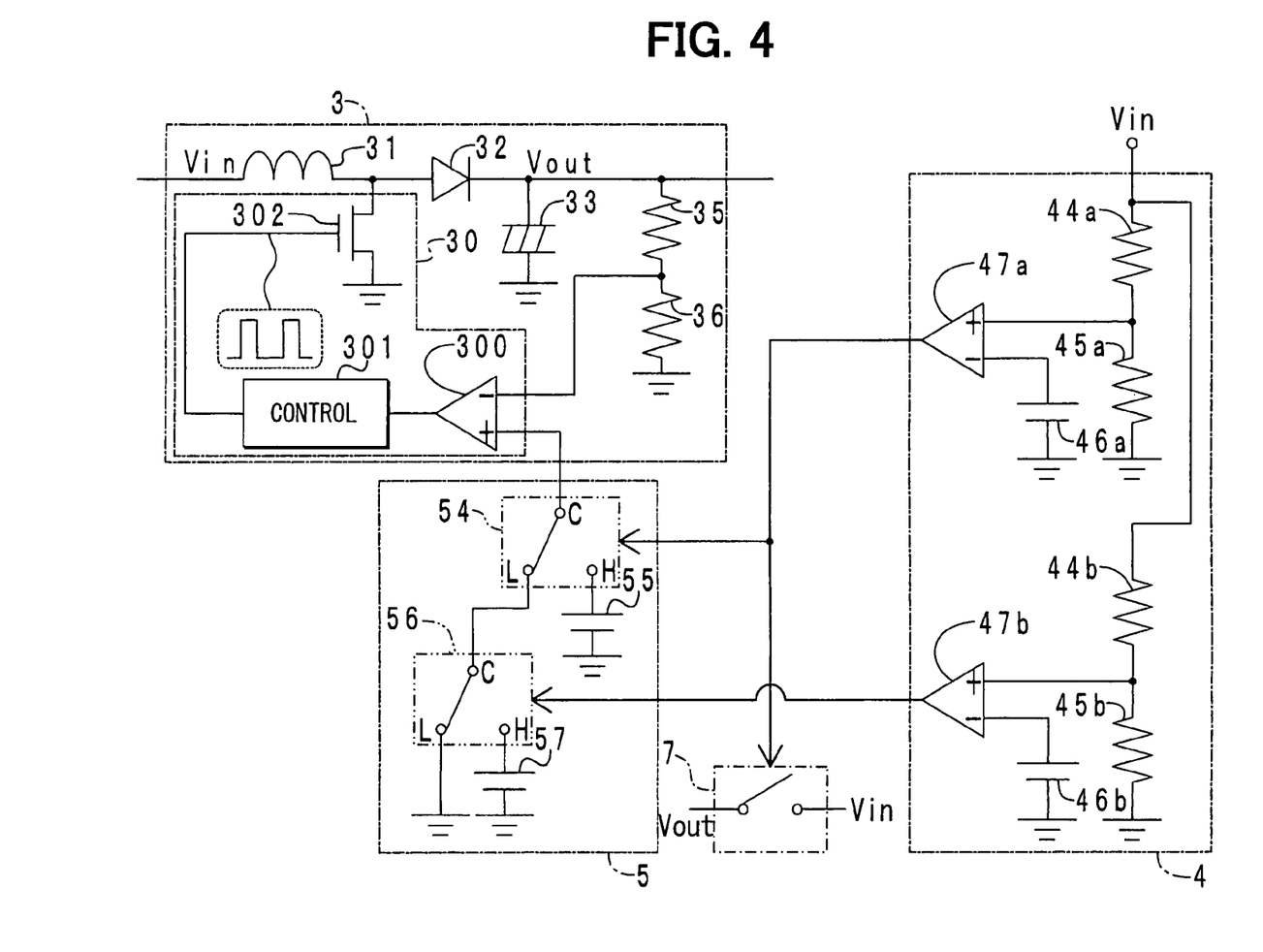
FIG. 4 is a partial circuit diagram of a power supply system according to a second embodiment of the present invention.

As illustrated in FIG. 4, the input voltage detecting circuit 4 comprises resistors 44a, 44b, 45a, 45b, reference voltage sources 46a, 46b, and comparators 47a, 47b. The input side of the resistor 44a is connected to the detecting point for input voltage Vin. The resistor 44a and the resistor 45a are connected in series with each other. The positive terminal of the comparator 47a is connected to the intermediate point between the resistor 44a and the resistor 45a. The negative terminal of the comparator 47a is connected to the reference voltage source 46a.

The input side of the resistor 44b is connected to the detecting point for the input voltage Vin. The resistor 44b and the resistor 45b are connected in series with each other. The positive terminal of the comparator 47b is connected to the intermediate point between the resistor 44b and the resistor 45b. The negative terminal of the comparator 47b is connected to the reference voltage source 46b.

The output voltage changing circuit 5 comprises selector switches 54, 56 and reference voltage sources 55, 57. The selector switch 54 is fed with a high level signal and a low level signal from the comparator 47a. The common terminal C of the selector switch 54 is connected to the positive terminal of the comparator 300 in the first power supply circuit 3. The H-contact of the selector switch 54 is connected to the reference voltage source 55. The L-contact of the selector switch 54 is connected to the common terminal C of the selector switch 56.

The selector switch 56 is fed with a high level signal and a low level signal from the comparator 47b. The H-contact of the selector switch 56 is connected to the reference voltage source 57. The L-contact of the selector switch 56 is grounded. The reference voltage of the reference voltage source 55 is different from the reference voltage of the reference voltage source 57.

In the first power supply circuit 3, the negative terminal of the comparator 300 of the feedback circuit 30 is connected to the intermediated point between resistors 35, 36. The positive terminal of the comparator 300 is connected to the common terminal C of the selector switch 54. Therefore, when the common terminal C and H-contact of the selector switch 54 are connected with each other, the comparator 300 is fed through its positive terminal with the reference voltage of the reference voltage source 55. When the common terminal C and L-contact of the selector switch 54 are connected with each other and the common terminal C and H-contact of the selector switch 56 are connected with each other, the comparator 300 is fed through its positive terminal with the reference voltage of the reference voltage source 57. When the common terminal C and L-contact of the selector switch 54 are connected with each other and the common terminal C and L-contact of the selector switch 56 are connected with each other, the comparator 300 is fed through its positive terminal with ground voltage.

Figure 5:
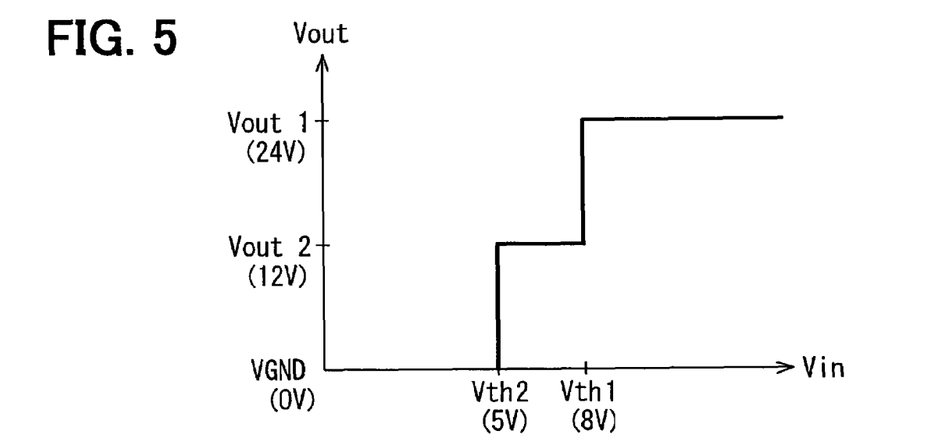
FIG. 5 is a graph of an output voltage change data for the power supply system in the second embodiment.

As illustrated in FIG. 5, when the input voltage Vin is equal to or higher than the first threshold value Vth1 (8V), the output voltage Vout is regulated to the first output voltage Vout1 (24V). When the input voltage Vin is lower than the first threshold value Vth1 and equal to or higher than the second threshold value Vth2 (5V), the output voltage Vout is regulated to the second output voltage Vout2 (12V). When the input voltage Vin is lower than the second threshold value Vth2, the output voltage Vout is regulated to ground voltage VGND (0V). Thus, the output voltage Vout is changed stepwise in three stages.

The first threshold value Vth1 illustrated in FIG. 5 is set by the resistors 44a and 45a, reference voltage source 46a and comparator 47a. More specifically, the input voltage Vin is divided by the resistors 44a and 45a. The divided voltage value from the input voltage Vin is inputted to the comparator 47a through its positive terminal. The voltage of the reference voltage source 46a is set to a voltage division value obtained by dividing the first threshold value Vth1 at the voltage division ratio of the resistors 44a and 45a. The voltage division value is inputted to the comparator 47a through its negative terminal. Thus, the comparator 47a compares the input voltage Vin with the first threshold value Vth1 through the comparison of the divided voltage value from the input voltage Vin with the voltage division value from the first threshold value Vth1. When Vin≧Vth1, the comparator 47a outputs the high level signal. When Vin<Vth1, the comparator 47a outputs the low level signal.

The signals of the comparator 47a are also inputted to the switching element 7. When the comparator 47a outputs the high level signal, the switching element 7 is opened. For this reason, the output side of the first power supply circuit 3 and the input side of the second power supply circuit 6 are disconnected from each other. When the comparator 47a outputs the low level signal, the switching element 7 is closed. For this reason, the output side of the first power supply circuit 3 and the input side of the second power supply circuit 6 are connected to each other.

The second threshold value Vth2 is set by the resistors 44b, 45b, reference voltage source 46b and comparator 47b. More specifically, the input voltage Vin is divided by the resistors 44b and 45b. The divided voltage value from the input voltage Vin is inputted to the comparator 47b through its positive terminal. The voltage of the reference voltage source 46b is set to a voltage division value obtained by dividing the second threshold value Vth2 at the voltage division ratio of the resistors 44b and 45b. The voltage division value is inputted to the comparator 47b through its negative terminal. Thus, the comparator 47b compares the input voltage Vin with the second threshold value Vth2 through the comparison of the divided voltage value from the input voltage Vin with the voltage division value from the second threshold value Vth2. When Vin≧Vth2, the comparator 47b outputs the high level signal. When Vin<Vth2, the comparator 47b outputs the low level signal.

The first output voltage Vout1 illustrated in FIG. 5 is set by the selector switch 54. More specifically, when the comparator 47a outputs the high level signal, electrical connection is established between the common terminal C and the H-contact of the selector switch 54. For this reason, the comparator 300 is fed through its positive terminal with the reference voltage of the reference voltage source 55. The voltage of the reference voltage source 55 is set to the voltage division value obtained by dividing the first output voltage Vout1 at the voltage division ratio of the resistors 35 and 36.

The second output voltage Vout2 and ground voltage VGND illustrated in FIG. 5 are set by the selector switch 56. More specifically, when the comparator 47a outputs the low level signal, electrical connection is established between the common terminal C and the L-contact of the selector switch 54. When the comparator 47b outputs the high level signal in this state, electrical connection is established between the common terminal C and the H-contact of the selector switch 56. For this reason, the comparator 300 is fed through its positive terminal with the reference voltage of the reference voltage source 57. The voltage of the reference voltage source 57 is set to the voltage division value obtained by dividing the second output voltage Vout2 at the voltage division ratio of the resistors 35 and 36.

When the comparator 47a outputs the low level signal and the comparator 47b outputs the high level signal, electrical connection is established between the common terminal C and the L-contact of the selector switch 56. For this reason, the comparator 300 is fed through its positive terminal with the ground voltage VGND.

Thus, the comparator 300 is fed through its positive terminal with the reference voltage of the reference voltage source 55 corresponding to the first output voltage Vout1, the reference voltage of the reference voltage source 57 corresponding to the second output voltage Vout2 or the ground voltage VGND. The comparator 300 is fed through its negative terminal with the divided voltage value obtained by dividing the output voltage Vout by the resistors 35 and 36. The comparator 300 compares the divided voltage value from the output voltage Vout, inputted through its negative terminal, with the voltage inputted through its positive terminal. When the result of comparison produces that the divided voltage value<the voltage, the comparator 300 outputs the high level signal. This means that the output voltage Vout has not reached the target voltage. The target voltage cited here refers to any of the first output voltage Vth1, the second output voltage Vth2 and the ground voltage VGND.

The high level signal from the comparator 300 is inputted to the control circuit 301. On receipt of the high level signal, the control circuit 301 generates a periodic rectangular signal. The control circuit 301 transmits an on/off command signal based on the rectangular signal to the transistor 302.

When the result of comparison at the comparator 300 produces that the divided voltage value≧the voltage, the comparator 300 outputs a low level signal. This means that the output voltage Vout has reached the target voltage. The low level signal from the comparator 300 is inputted to the control circuit 301. On receipt of the low level signal, the control circuit 301 stops generating the rectangular signal. Therefore, the transistor 302 is held turned off.

When the input voltage Vin is equal to or higher than the first threshold value Vth1, the output voltage Vout is regulated to the first output voltage Vout1 by the feedback control. Further, the switching element 7 is opened. For this reason, electrical connection between the first power supply circuit 3 and the second power supply circuit 6 is interrupted. Therefore, the first power supply circuit 3 only has to bear the current i1 of the firing circuit 83 and the satellite sensor communication circuit 84. The current i2 of the second power supply circuit 6 is supplied from the battery 2 to the second power supply circuit 6 through the reverse current blocking diode 81.

When the input voltage Vin is lower than the first threshold value Vth1 and equal to or higher than the second threshold value Vth2, the output voltage Vout is regulated to the second output voltage Vout2 by the feedback control. Further, the switching element 7 is closed. For this reason, electrical connection is ensured between the first power supply circuit 3 and the second power supply circuit 6. Therefore, the first power supply circuit 3 bears the currents i1 and i2.

When the input voltage Vin is lower than the second threshold value Vth2, the output voltage Vout is regulated to the ground voltage VGND by the feedback control. Further, the switching element 7 is closed. For this reason, electrical connection is ensured between the first power supply circuit 3 and the second power supply circuit 6. In this case, the first power supply circuit 3 bears the currents i1 and i2 by the electric charges stored in the backup capacitor 82 because the first power supply circuit 3 is in the stopped state.

In this power supply system 1, the first power supply circuit 3 and the second power supply circuit 6 are connected or disconnected with reference to the first threshold value Vth1. More specifically, when the input voltage Vin is equal to or higher than the first threshold value Vth1 (8V), the switching element 7 is opened. Namely, the switching element 7 is opened when the supply voltage of the battery 2 is 9V or higher with the voltage drop (1V) at the reverse current blocking diode 80 taken into account. As a result, the first power supply circuit 3 and the second power supply circuit 6 are disconnected from each other.

For this reason, when the supply voltage of the battery 2 is 9V or higher, the first power supply circuit 3 need not bear the current i2 of the second power supply circuit 6. Therefore, the voltage step-up control load on the first power supply circuit 3 can be reduced. Further, increase in the size and rating of the first power supply circuit 3 can be suppressed.

When the input voltage Vin is lower than the first threshold value Vth1 and equal to or higher than the second threshold value Vth2, the switching element 7 is closed. Namely, the switching element 7 is closed when the supply voltage of the battery 2 is lower than 9V and equal to or higher than 6V with the voltage drop at the reverse current blocking diode 80 taken into account. As a result, the first power supply circuit 3 and the second power supply circuit 6 are connected with each other.

For this reason, when the supply voltage of the battery 2 is lower than 9V and equal to or higher than 6V, the first power supply circuit 3 must bear both the current i1 of the firing circuit 83 and the satellite sensor communication circuit 84 and the current i2 of the second power supply circuit 6. However, when the supply voltage of the battery 2 is lower than 9V and equal to or higher than 6V, the output voltage Vout is regulated to the second output voltage Vout2 (12V). For this reason, the voltage step-up control load on the first power supply circuit 3 can be reduced more than in cases where the output voltage Vout is held at the constant value, or the first output voltage Vout1 (24V). In addition, increase in the size and rating of the first power supply circuit 3 can be suppressed.

When the input voltage Vin is lower than the second threshold value Vth2, namely, when the supply voltage of the battery 2 is lower than 6V, the output voltage Vout is regulated to the ground voltage VGND (0V). Here, it is assumed that the proper operation of the ECU is guaranteed with the supply voltage of the battery 2 being 6V or higher. Therefore, when the supply voltage of the battery 2 is lower than 6V, the voltage step-up control of the first power supply circuit 3 is stopped without fail. As indicated by the dotted line in FIG. 3, this avoids the following phenomenon when the input voltage drops below the second output voltage Vout2 and approaches the ground voltage VGND: the output voltage Vout is not stepped up to the second output voltage Vout2 and takes an erroneous value. That is, it prevents the ECU from operating in improper conditions.

The output voltage changing circuit 5 changes the setting of the selector switches 54 and 56 based on the detection signal from the input voltage detecting circuit 4. The output voltage changing circuit 5 changes the voltage inputted to the comparator 300 through its positive terminal in three stages: the reference voltage of the reference voltage source 55; the reference voltage of the reference voltage source 57; and the ground voltage. For this reason, it is unnecessary to change the voltage division ratio for the output voltage Vout inputted to the comparator 300 through its negative terminal.

The supply voltage from the battery 2 can be lowered due to, for example, a trouble in the vehicle power generation system even though the vehicle is traveling. Meanwhile, there is a demand to keep the power supply system 1 operating as long as the engine control ECU can be operated with the supply voltage from the battery 2.

In the power supply system 1, even when the input voltage Vin drops below the first threshold value Vth1 (8V), the output voltage Vout can be held at the second output voltage Vout2 (12V) as long as the supply voltage from the battery 2 is 6V or higher. Namely, even when the supply voltage from the battery 2 drops below 9V, the foregoing can be done as long as the supply voltage from the battery 2 is 6V or higher. Therefore, the second power supply circuit 6 and thus the power supply system 1 can be operated.

Modifications

The switching element 7 in the second embodiment may be opened and closed with reference to the second threshold value Vth2. Thus, the first power supply circuit 3 and the second power supply circuit 6 are connected with each other only when the input voltage Vin is lower than the second threshold value Vth2, lower than the first threshold value Vth1. For this reason, while the output voltage Vout is regulated to the first output voltage Vout1 or the second output voltage Vout2, the current i2 of the second power supply circuit 6 need not be taken into account at the first power supply circuit 3. Therefore, the control load on the first power supply circuit 3 can be effectively reduced, especially, when the proper operation is guaranteed with the supply voltage from the battery 2 being 6.5V or higher. That is, the control load can be effectively reduced under such conditions for the guarantee of proper operation that the second power supply circuit 6 can operate without voltage supply from the first power supply circuit 3. In addition, increase in the size and rating of the first power supply circuit 3 can be suppressed.

Figure 6:
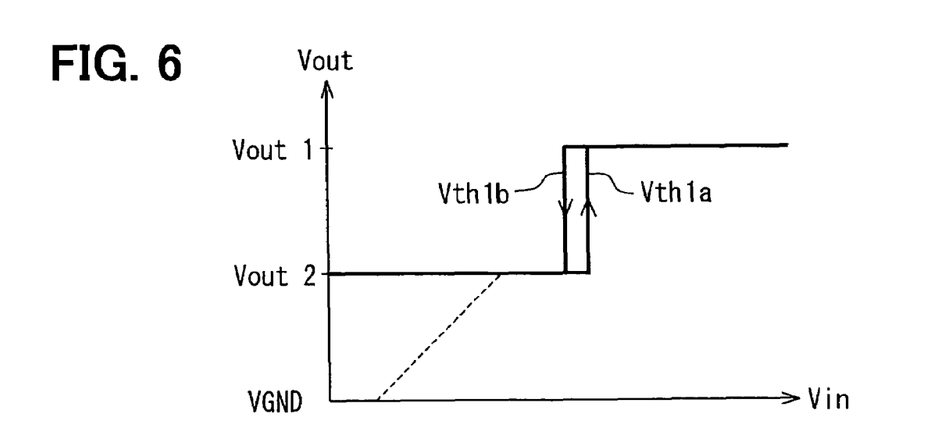
FIG. 6 is a graph of an output voltage change for a power supply system in a modification of the first embodiment of the present invention.

In the above embodiments, the output voltage may be changed by software. For example, the input voltage is taken into a microcomputer through an A-D converter, the input voltage is compared with a first threshold value and a second threshold value stored in a ROM, then the output voltage is changed according to the result of comparison. For threshold value for the input voltage, such a hysteresis characteristic as illustrated in FIG. 6 may be set. Specifically, when the output voltage Vout is changed from Vout2 to Vout1, a first threshold value Vth1$a$ may be used. When the output voltage Vout is changed from Vout1 to Vout2, a first threshold value Vth1$b$ may be used. There are several methods for setting hysteresis on the threshold value. For example, hysteresis can be set on comparators.

The number of installed microcomputer 85, crash sensor 86, or satellite sensor is not limited to those used in the above embodiments. For example, as the crash sensors 86, a longitudinal crash sensor capable of detecting front impact, a lateral crash sensor capable of detecting side impact, a rollover sensor capable of detecting vehicle rollover and the like may be used. As the satellite sensors, a front sensor capable of detecting front impact, a side sensor capable of detecting side impact and the like may be used.

The output voltage may be controlled in two stages by changing the reference voltage in the first embodiment. Similarly, the output voltage may be controlled in three stages by changing the resistor voltage division ratio in the second embodiment.

The above various set values are just examples and may be set to different values.

The input voltage Vin may be compared with the predetermined threshold values Vth1 and Vth2 at the output voltage changing circuit 5. That is, the input voltage Vin itself is transmitted from the input voltage detecting circuit 4 to the output voltage changing circuit 5, and subsequent computation processing is performed at the output voltage changing circuit 5.

The output voltage Vout need not be varied in steps but may be varied gradually. As an occupant protector, any occupant crash protector such as a seat belt pretensioner other than an airbag may be driven.

Further, the power supply system according to the above embodiments may be applied to various vehicle control devices other than the passive safety device.

What is claimed is:

1. A power supply system for a vehicle having a battery and a vehicle device comprising:
    a step-up means that steps up an input voltage supplied from the battery to an output voltage, which is applied to the vehicle device;
    an input voltage detecting means that detects the input voltage supplied to the step-up means; and
    an output voltage changing means, configured to control a step-up operation of the step-up means based on the input voltage detected by the input voltage detecting means,
    wherein the input voltage detecting means produces a result of comparison of the input voltage with a predetermined threshold value to the output voltage changing means, and
    wherein the input voltage detecting means compares a divided voltage value from the input voltage with a voltage division value from the threshold value, and thereby compares the input voltage with the threshold value.

2. The power supply system according to claim 1, wherein the step-up means includes a feedback means that regulates the output voltage by a feedback control according to a result of comparison of a divided voltage value obtained by dividing the output voltage at a predetermined voltage division ratio with a predetermined reference voltage.

3. The power supply system according to claim 2, wherein the output voltage changing means changes the voltage division ratio based on the input voltage to the step-up means.

4. The power supply system according to claim 2, wherein the output voltage changing means changes the reference voltage based on the input voltage to the step-up means.

5. The power supply system according to claim 2, wherein the feedback means has:
    a comparator that compares the divided voltage value with the reference voltage;
    a switching element for output voltage capable of regulating the output voltage; and
    a control circuit that drives and controls the switching element for output voltage according to the result of comparison by the comparator.

6. The power supply system according to claim 1, further comprising:
    a sensor operable with a voltage lower than that of the vehicle device; and
    a switching element connected between the step-up means and the sensor,
    wherein the input voltage detecting means turns on the switching element only when the input voltage is lower than a threshold value, so that the sensor is operated by the use of the output voltage of the step-up means.

7. The power supply system according to claim 6, wherein the sensor is for detecting a crash of the vehicle and the vehicle device is for activating a passive safety device of the vehicle.

8. The power supply system according to claim 1, wherein the output voltage changing means is configured to instruct the step-up means to set a value of the output voltage based on the input voltage.

9. The power supply system according to claim 1, wherein the divided voltage value is less than the input voltage.

10. The power supply system according to claim 1, wherein the output voltage changing means further comprises:
    a first resistor connected between the input voltage and an intermediate node; and
    a second resistor connected between the intermediate node and ground,
    wherein the divided voltage value is an intermediate voltage value at the intermediate node.

11. A power supply system for a vehicle having a battery and a vehicle device comprising:
    a step-up means that steps up an input voltage supplied from the battery to an output voltage, which is applied to the vehicle device;
    an input voltage detecting means that detects the input voltage to the step-up means; and
    an output voltage changing means that changes the output voltage based on the input voltage to the step-up means,
    wherein the input voltage detecting means produces a result of comparison of the input voltage with a predetermined threshold value to the output voltage changing means,
    wherein the threshold value is a first threshold value and a second threshold value lower than the first threshold value,
    wherein the output voltage changing means regulates the output voltage to a first output voltage when the input voltage is equal to or higher than the first threshold value,
    wherein the output voltage changing means regulates the output voltage to a second output voltage tower than the first output voltage when the input voltage is lower than the first threshold value and higher than the second threshold value, and
    wherein the output voltage changing means stops the voltage step-up operation of the step-up means when the input voltage is lower than the second threshold value.

12. A power supply system for a vehicle having a battery and a vehicle device comprising:
    a step-up means that steps up an input voltage supplied from the battery to an output voltage, which is applied to the vehicle device;
    an input voltage detecting means that detects the input voltage to the step-up means;
    an output voltage changing means that changes the output voltage based on the input voltage to the step-up means;

a step-down means that steps down the input voltage based on the supply voltage from the battery to obtain a predetermined output voltage; and a switching element that disconnectably connects an output side of the step-up means and the input side of the step-down means, wherein the input voltage detecting means produces a result of comparison of the input voltage with a predetermined threshold value to the output voltage changing means, wherein between the battery and the step-down means, a first path in which the step-up means and the switching element are placed and a second path in which the step-up means or the switching element is not placed are established in parallel, wherein the switching element connects the output side of the step-up means and the input side of the step-down means and the battery and the step-down means are connected with each other through the fist path, when the input voltage is lower than the threshold value, and wherein the switching element disconnects the output side of the step-up means and the input side of the step-down means from each other and the battery and the step-down circuit are connected with each other through the second path, when the input voltage is higher than the threshold value.

13. The power supply system according to claim 12, wherein:

the threshold value is a first threshold value;

the output voltage changing means regulates the output voltage to a first output voltage and the switching element disconnects the output side of the step-up means and the input side of the step-down means from each other, when the input voltage is higher than the first threshold value; and the output voltage changing means regulates the output voltage to a second output voltage lower than the first output voltage and the switching element connects the output side of the step-up means and the input side of the step-down means, when the input voltage is lower than the first threshold value.

14. The power supply system according to claim 12, wherein:

the threshold value is a first threshold value and a second threshold value lower than the first threshold value;

the output voltage changing means regulates the output voltage to a first output voltage and the switching element disconnects the output side of the step-up means and the input side of the step-down means from each other, when the input voltage is higher than the first threshold value;

the output voltage changing means regulates the output voltage to a second output voltage lower than the first output voltage and the switching element connects the output side of the step-up means and the input side of the step-down means, when the input voltage is lower than the first threshold value and higher than the second threshold value; and the output voltage changing means stops a voltage step-up operation of the step-up means and the switching element connects the output side of the step-up means and the input side of the step-down means, when the input voltage is lower than the second threshold value.

15. The power supply system according to claim 12, wherein:

the threshold value is a first threshold value and a second threshold value lower than the first threshold value;

the output voltage changing means regulates the output voltage to a first output voltage and the switching element disconnects the output side of the step-up means and the input side of the step-down means from each other, when the input voltage is higher than the first threshold value;

the output voltage changing means regulates the output voltage to a second output voltage lower than the first output voltage and the switching element disconnects the output side of the step-up means and the input side of the step-down means from each other, when the input voltage is lower than the first threshold value higher than the second threshold value; and the output voltage changing means stops a voltage step-up operation of the step-up means and the switching element connects the output side of the step-up means and the input side of the step-down means, when the input voltage is lower than the second threshold value.

* * * * *